US007013747B2

(12) United States Patent
Drake

(10) Patent No.: US 7,013,747 B2
(45) Date of Patent: Mar. 21, 2006

(54) INTERNAL RECIRCULATING BALL SCREW AND NUT ASSEMBLY

(75) Inventor: John Drake, Warren, OH (US)

(73) Assignee: White Stroke LLC, Warren, OH (US)

( * ) Notice: Subject to any disclaimer, the term of this patent is extended or adjusted under 35 U.S.C. 154(b) by 345 days.

(21) Appl. No.: 10/413,936

(22) Filed: Apr. 15, 2003

(65) Prior Publication Data
US 2004/0103734 A9    Jun. 3, 2004

Related U.S. Application Data

(60) Provisional application No. 60/372,553, filed on Apr. 15, 2002.

(51) Int. Cl.
F16H 1/18    (2006.01)
(52) U.S. Cl. ................... 74/424.83; 74/424.84
(58) Field of Classification Search .......... 74/424.83, 74/424.84
See application file for complete search history.

(56) References Cited

U.S. PATENT DOCUMENTS

| 888,619 | A | 5/1908 | Kelly |
|---|---|---|---|
| 1,535,135 | A | 4/1925 | Rodel |
| 1,565,805 | A | 12/1925 | Jones |
| 1,750,140 | A | 3/1930 | Thompson |
| 2,069,471 | A | 2/1937 | Baker |
| 2,082,433 | A | 6/1937 | Whitcomb |
| 2,166,106 | A | 7/1939 | Gormley |
| 2,236,492 | A | 3/1941 | Costello |
| 2,322,000 | A | 6/1943 | Douglas |
| 2,350,538 | A | 6/1944 | Seines |
| 2,450,282 | A | 9/1948 | Jackson |
| 2,503,009 | A | 4/1950 | Thomson |
| 2,519,777 | A | 8/1950 | Cochrane |
| 2,581,482 | A | 1/1952 | Hawkins |
| 2,618,166 | A | 11/1952 | Douglas |
| 2,636,397 | A | 4/1953 | Jacubenta |
| 2,673,473 | A | 3/1954 | Phelps |
| 2,694,942 | A | 11/1954 | Hellen |
| 2,714,821 | A | 8/1955 | Orner |
| 2,724,284 | A | 11/1955 | Anderson et al. |
| 2,749,812 | A | 6/1956 | Wetzel |
| 2,756,609 | A | 7/1956 | Hogan et al. |
| 2,770,155 | A | 11/1956 | Morgan |
| 2,802,373 | A | 8/1957 | Schottler |
| 2,842,007 | A | 7/1958 | Brant |
| 2,842,978 | A | 7/1958 | Orner |
| 2,891,414 | A | 6/1959 | Gillum |
| 2,895,343 | A | 7/1959 | Orner |
| 2,919,596 | A | 1/1960 | Kuehl |
| 2,924,113 | A | 2/1960 | Orner |
| 2,933,941 | A | 4/1960 | Millns |
| 2,945,392 | A | 7/1960 | Folkerts |
| 2,946,235 | A | 7/1960 | Musser |

(Continued)

Primary Examiner—David Fenstermacher
(74) Attorney, Agent, or Firm—Fay, Sharpe, Fagan, Minnich & McKee, LLP

(57) ABSTRACT

An internal recirculating ball screw and nut system that is easier to manufacture and more reliant by virtue of a particular configuration of the grooves on the interior of the nut or the follower. Crossback portions of select nut grooves are arranged in a manner that allows the bearing balls to recirculate by slipping over the top of adjacent thread lands of the screw, advancing and recirculating within a single 360 degree rotation within said nut. Said recirculation is accomplished solely through the design of the path of a unitary nut, without use of any ancillary devices.

17 Claims, 5 Drawing Sheets

U.S. PATENT DOCUMENTS

| | | |
|---|---|---|
| 2,969,689 A | 1/1961 | Martens |
| 2,978,920 A | 4/1961 | Sears et al. |
| 3,006,212 A | 10/1961 | Galonska |
| 3,009,367 A | 11/1961 | Striggow |
| 3,046,801 A | 7/1962 | Pravel |
| 3,132,719 A | 5/1964 | Cole |
| 3,141,349 A | 7/1964 | McDonald |
| 3,156,133 A | 11/1964 | Anthony |
| 3,176,535 A | 4/1965 | Rowland |
| 3,178,958 A | 4/1965 | Beck |
| 3,186,249 A | 6/1965 | Lanzenberger |
| 3,186,250 A | 6/1965 | Boutwell |
| 3,198,029 A | 8/1965 | Orner |
| 3,234,810 A | 2/1966 | Orner |
| 3,261,224 A | 7/1966 | Anthony |
| 3,301,082 A | 1/1967 | Kosinski |
| 3,327,551 A | 6/1967 | Prueter |
| 3,372,605 A | 3/1968 | Orner |
| 3,393,576 A | 7/1968 | Carlson |
| 3,393,577 A | 7/1968 | Better |
| 3,398,575 A | 8/1968 | Saxi |
| 3,494,215 A | 2/1970 | Fengler |
| 3,577,796 A | 5/1971 | Eissfeldt |
| 3,589,202 A | 6/1971 | Stanley |
| 3,638,507 A | 2/1972 | Orner |
| 3,667,311 A | 6/1972 | Wysong |
| 3,673,886 A | 7/1972 | Tomita et al. |
| 3,791,232 A | 2/1974 | Helmer |
| 3,826,153 A | 7/1974 | Sheppard |
| 3,958,678 A | 5/1976 | Jeter |
| 3,961,541 A | 6/1976 | Fund et al. |
| 4,034,833 A | 7/1977 | Jeter |
| 4,074,585 A | 2/1978 | Richaud et al. |
| 4,074,587 A | 2/1978 | Brusasco |
| 4,141,255 A | 2/1979 | Nilsson |
| 4,173,907 A | 11/1979 | Lundgren |
| 4,186,620 A | 2/1980 | Brusasco |
| 4,198,872 A | 4/1980 | Metz |
| 4,203,328 A | 5/1980 | DeBoynton |
| 4,224,831 A | 9/1980 | Nilsson |
| 4,226,137 A | 10/1980 | Sharp |
| 4,274,297 A | 6/1981 | Blurock et al. |
| 4,364,282 A | 12/1982 | Nilsson |
| 4,366,723 A | 1/1983 | Wilke et al. |
| 4,474,073 A | 10/1984 | Blaurock et al. |
| 4,924,722 A * | 5/1990 | Bacardit et al. ......... 74/424.83 |
| 6,439,338 B1 | 8/2002 | Yoshioka et al. |

* cited by examiner

INTERNAL RECIRCULATING BALL SCREW AND NUT ASSEMBLY

This is a continuation-in-part application of Provisional Patent Application Ser. No. 60/372,553, filed Apr. 15, 2002.

FIELD OF INVENTION

The present invention relates generally to devices for converting rotary movement into linear movement or motion, and vice versa. In particular, the present invention is directed to a ball screw and unitary nut assembly in which a plurality of bearing balls are internally recirculated between complementary grooves formed on the exterior structure of the screw and the internal structure of the surrounding unitary nut engaged therewith. Included within each groove formed in the interior structure of the surrounding nut is at least one area having sufficient depth and structure from the rest of the groove to permit the balls to slide over the ridges or lands between adjacent grooves in the ball screw. This arrangement facilitates the recirculation of the bearing balls without any ancillary pieces and produces smooth rotation of the nut and screw in relation to each other with minimum friction losses. This also facilitates the controlled axial translation of the nut along the major axis of the screw.

BACKGROUND OF THE INVENTION

A ball nut is a nut having a semi-circular helical groove on its inner diameter that fits over a shaft or ball screw having a mating semi-circular helical groove on its outer diameter. The load is transmitted by balls running in the grooves and returning in various manners through non-load carrying sections in the screw, nut or ancillary components.

Ball screw and nut assemblies are commonly utilized in extremely important control and actuation devices. One well-known application is the precise adjustment of flight control surfaces, as exemplified by U.S. Pat. No. 4,715,262 to Nelson et al., incorporated herein by reference. There are also many other precision control and machine applications. In particular, ball screw and nut assemblies are relied upon for ease of rotation, transforming rotation into a very precise lateral movement along the major axis of the screw.

While a wide variety of ball screw and nut designs are known, they share similar characteristics. Conventional ball screw nut assemblies commonly include a round leadscrew having a continuous helical groove or thread (with accompanying lands) along its length and a follower or nut with a mating continuous internal groove or thread that cooperates with the external groove of the leadscrew to form a course or race directing circulating bearing balls. The course is sized to contain a single-file row of a plurality of balls, which operate in rolling contact with both the leadscrew groove and the follower (or nut) groove as one is rotated relative to the other. The balls are displaced along the course as the leadscrew and follower rotate with respect to each other, facilitating easy and precise translation to lateral movement or motion.

The operation of this type of ball screw reduces frictional resistance, thereby saving power. The smooth relative rotation (as compared to other screw thread systems) and resulting smooth lateral movement facilitate high-speed operation. As a result, ball screw nut assemblies are often used in feed systems for cutting tools, or in other precision manufacturing applications.

In such ball screw and nut assemblies, the balls are caused to roll along the race or course by the relative rotation of the screw and nut. As a result, a structure for recirculating the balls is necessary. Conventional ball screw nut assemblies use a number of structures, techniques, etc., whereby the balls are recirculated, including the use of external and internal recirculation systems.

One aspect of a highly efficient operation of a ball screw nut assembly resides in the swift, unimpeded recirculation of the bearing balls. Examples of various types of external recirculating devices are found in the Nelson et al '262 patent, supra, and U.S. Pat. No. 6,109,415 to Morgan et al., both incorporated herein by reference. However, a drawback of this type of design having an external recirculation system of external tubes, channels, etc., is that the overall ball screw and nut configuration tends to be large and awkward. Consequently, various types of internal recirculating devices have been designed in order to address these difficulties.

One type of internal recirculating device is found in the embodiment shown in FIG. 5 of U.S. Pat. No. 5,832,776 to Kuo, incorporated herein by reference. However, it should be recognized that the recirculating or return path is merely a separate passage 51 formed in the nut or follower body 31. The passage runs parallel with the center axis of the main shaft of the leadscrew and it acts to channel or guide the balls from one end of the nut body to the other. This passage essentially acts in the same manner as the external recirculating tubes or channels depicted in the Morgan et al or Nelson et al patents, increasing the overall size of the device.

Additionally, a further difficulty encountered with this type of internal recirculation ball screw design is that the alignment of the return holes in the nut or follower may not form a sufficiently precise course or race for the easy recirculation of the balls. Sufficient precision must be maintained so that the balls transfer smoothly in both directions from the race or course to the follower or nut recirculation device. This makes the manufacturing process difficult and costly.

Moreover, if the balls are not constrained in precise alignment with each other, they may try to bypass each other and lock up, thereby causing complete failure of the ball screw and nut device. While this is an annoyance with machine tools, it can be disastrous in other applications of ball screw and nut assemblies, such as automobile steering, aeronautical flight control, etc.

This vulnerability becomes extremely pronounced when internal recirculating devices (also known as returns, crossbacks, switchovers, switchbacks, and flipbacks), such as that in the FIG. 2 of the Kuo patent, supra., are used. The return paths or switchbacks of Kuo return the balls to a previous position on an "upstream" groove to retrace the balls' forward path for each groove in the nut. This is effected by the use of return caps (32), which are squeezed into long and radial holes (34). An S-shaped sliding slot (321) is used to provide the return path for every two neighboring grooves. Because the S-shaped slots are relatively short, and must guide the balls through relatively sharp angles, the smooth flow of the balls may be impeded.

Moreover, manufacturing the arrangement set forth in FIG. 2 of Kuo requires a very complex process. The three-dimensional S-shape is difficult to align with any precision, except when substantially increased manufacturing times and complexities are involved. Even then, the use of the radial holes (34) for return caps (32) weakens the overall nut structure, as well as complicating the manufacturing process. Further, use of the radial holes (34) to insert return caps (32) in the Kuo device creates a danger that the ball bearings could escape through the holes if a cap were to fail. Besides the manufacturing complexity required for the Kuo device, it is also considered questionable for use in critical applications since the return caps could allow escape of the ball bearings and disastrous failure of the ball screw.

The difficulties produced by the device shown in FIG. 1 of the Kuo '776 patent have been addressed in a number of ways. One common technique is to eliminate the radial holes (34) and return caps (32) by substituting an insert into the threads along the length (major axis) of the nut or follower. Currently, separate inserts providing multiple S-shaped return paths are used in some ball screw and nut designs. FIG. 1 depicts a typical representation of a conventional design in which a continuous pattern of grooves (cuts 1 and 11) is ground or cut to form the interior threads of the nut body or follower (2). A portion of the threaded interior of the nut body (2) is cut out, i.e. slot (21), and a mating insert (3) is placed therein.

More particularly, in the conventional design shown in FIG. 1, insert (3) is fitted into nut body (2) by virtue of cutting out a section of the interior of nut (2), including portion of grooves (11) and (1). The rectangular cut out (21) must be sized and positioned so that insert (3) can be inserted in a manner that allows return grooves (31) to align with nut grooves (11) in the manner depicted in FIG. 1. The radial holes (34) and return caps (32) of the Kuo device are eliminated, and the manufacturing process is somewhat simplified.

It should be noted that FIG. 1 is merely a representation of a number of aspects of a conventional design, and is not an exact view of the ball screw nut assembly as it is arranged. In particular, the grooves of the screw are not shown at all. Rather, the view of FIG. 1 is of a nut that has been sectionalized to show the interior of the nut body. Superimposed upon this view is an additional view of insert (3), as it would appear for the inner face of the insert (3) that interfaces with the nut threads (11).

The recirculating grooves (31) of insert (3) reroute the balls (not shown) to align with an "upstream" thread (11) arranged ahead or "upstream" of the insert (3). The ball then restarts its forward advance along the race until it reaches insert (3) once again. In this conventional art arrangement, for selected grooves (11) of nut (2), there is a corresponding external thread groove (not shown) in a mating screw, and a recirculating or crossback groove (31) so that for each rotation of screw (1) with respect to nut (2) the bearing balls are recirculated.

While the aforementioned insert design of FIG. 1 avoids some of the difficulties described with respect to other conventional ball screws, there are still problems to this design. For example, in order to accommodate a practical thickness for insert (3), slot (21) must be cut very deeply through the interior threads (11) into the wall of nut (2). This substantially weakens the nut, as well as constitutes additional manufacturing effort. With the placement of insert (3) into nut (2), additional inaccuracies are introduced to the structure since some deformation of the insert or nut often occurs. This is especially critical due to the limited practical width of insert (3), which requires that the switchover path (31) encompass relatively sharp angles through which the balls must pass. Deformation of the insert could warp the flipovers or crossbacks (31) to the point that the movement of the balls is substantially impeded or even stopped. If the slot (21) is not precisely cut, or the insert (3) is not precisely sized, forcing the insert into the slot could also cause distortion of the insert, thereby degrading the flipover or crossback route (31).

Moreover, because the slot (21) that holds insert (3) must be deeply cut into the nut body to accommodate crossback grooves (31), the nut (2) is substantially weakened. Heat-treating of the nut to provide long-life ball grooves becomes problematical once the cut is made. Further, heat-treating may be impossible once the insert (3) has been inserted into slot (21). The result of all of these factors is a significantly weakened nut body, making its use in such critical systems as automobile steering problematical.

Additionally, several ball screw and nut assemblies have been developed directed to the use of intermediate rings, carriers, inert flexible tapes or strips, etc., to assist in guidance or the prevention of loss or the recirculating ball bearings. See, for example, U.S. Pat. No. 4,612,817. Similarly, multiple component ball screw and nut assemblies have been produced which utilize two or more pieces to produce the nut or screw components. See, for example, U.S. Pat. Nos. 3,393,575 and 3,393,576. However, the inclusion of these additional elements produces numerous manufacturing and assembly difficulties, all at increased cost.

Accordingly, there is a substantial need for improved ball screw and nut assemblies that overcome the aforementioned drawbacks of the conventional technology. Such an improved ball screw and nut assembly would be easier to manufacture than conventional models and be highly reliable, especially in regard to preventing escape of the bearing balls from the device.

SUMMARY OF THE INVENTION

Accordingly, an object of the present invention is to provide a ball screw and nut assembly that overcomes the major drawbacks of the conventional technology.

It is another object of the present invention to provide a ball screw and nut assembly in which the recirculating movement of the bearing balls is not slowed or otherwise hindered.

It is a further object of the present invention to provide a ball screw and nut assembly having a structure that assures that the balls will not be lost when the ball screw and/or nut is subjected to stress.

It is an additional object of the present invention to provide a ball screw and nut assembly that avoids conventional heat treatment distortion problems.

It is still another object of the present invention to provide a ball nut, which maintains its full radial strength, and provides improved radial rigidity over conventional ball nuts having radial through-holes.

It is yet an additional object of the present invention to provide a ball screw and nut system with improved movement characteristics over comparable conventional devices.

It is again another object of the present invention to provide a ball nut, which can be made using a single manufacturing operation, with one or multiple cuts.

It is still a further object of the present invention to provide a ball screw and nut system that is stronger than comparable conventional ball screws.

It is again another object of the present invention to provide a ball screw and nut system with a unitary nut having a manufactured internal ball bearing return in which recirculation alignment problems are minimized.

It is yet an additional object of the present invention to provide a ball nut that is more compact, due to thinner wall structures, than comparable conventional devices.

It is still a further object of the present invention to provide a ball nut that avoids heat treatment problems inherent to ball nuts that have cutouts for longitudinal inserts.

It is again another object of the present invention to provide a ball screw and nut system in which the recirculation of the balls is facilitated by the rotation of a screw within a single nut and without the use of any ancillary pieces.

It is yet an additional object of the present invention to provide a ball screw and nut system that can be manufactured more economically than comparable conventional ball screw and nut systems using inserts or through-holes for return caps.

It is still a further object of the present invention to provide a manufacturing operation for a ball screw that is controlled by means of a computerized machine tool.

It is yet an additional object of the present invention to provide a simplified method of manufacture for a ball screw and nut assembly.

It is again another object of the present invention to provide a bearing ball recirculation system with a ball screw and nut arrangement with minimum modifications to the standard configuration of the thread of the leadscrew.

These and other goals and objects of the present invention are achieved by a ball screw and unitary nut assembly including a threaded screw having helical exterior lands and grooves, and a complementary grooved nut having helical interior lands and grooves. The unitary nut is arranged to rotate relative to the screw to achieve lateral movement along the central axis of the screw. The assembly also includes a plurality of bearing balls arranged in one or more single file rows between the screw and the nut and forced to move in either direction along the central axis on a path formed by the grooves of the screw and the nut as a result of rotation of the nut relative to the screw. Also included within the interior grooves of the nut is an internal ball recirculating system having sufficient depth and opposite helix from the rest of the groove to allow the bearing balls to slide over at least one land or ridge between adjacent grooves of the threaded ball screw. This arrangement facilitates the recirculation of the bearing balls without ancillary pieces and produces smooth rotation of the nut and screw in relation to each other with minimum friction losses.

In another embodiment of the present invention a unitary grooved nut having lands and grooves is used as part of a ball screw and nut assembly. Both the nut and the screw have complementary helical lands and grooves. These grooves form an advancing path for a plurality of bearing balls, which are recirculated by one or more internal reversal circuits in the nut. These are formed on an inner circumference of the threaded nut and each constitutes a circuit of 360 degrees. The circuit consists of a path portion for advancing the bearing balls along the path of the screw and a path portion for returning the bearing balls in the opposite direction. The return portion has sufficient depth and structure (i.e., helix, etc.) different from the advancing portion of groove of the path to permit the balls to rise over the ridges or lands between adjacent grooves in the ball screws. In this regard, when the bearing balls enter into the return, they become unloaded and return over the land into the adjacent groove present in the screw.

These and other objects and features of the present invention will be apparent from the following summary and description of the invention, as well as from the drawings and the claims.

BRIEF DESCRIPTION OF THE DRAWINGS

The following is a brief description of the drawings, which are presented for the purposes of illustrating the invention and not for the purposes of limiting the same.

DETAILED DESCRIPTION OF THE PREFERRED EMBODIMENTS

The configuration of the present invention is explained in detail with respect to reference to FIGS. 2 through 6. In this regard, nut (2) and screw (4) are complementary threaded devices interacting in a manner well known in the conventional technology. The complementary grooves of the screw and grooves of the nut form a channel, race or course through which bearing balls (5), as depicted in FIG. 2, are retained and passed. These balls are in rotational contact with the grooves of both the screw and the nut, facilitating smooth, easy, rotational movement of the nut and screw with respect to each other even under the application of a load.

Figure 2B:
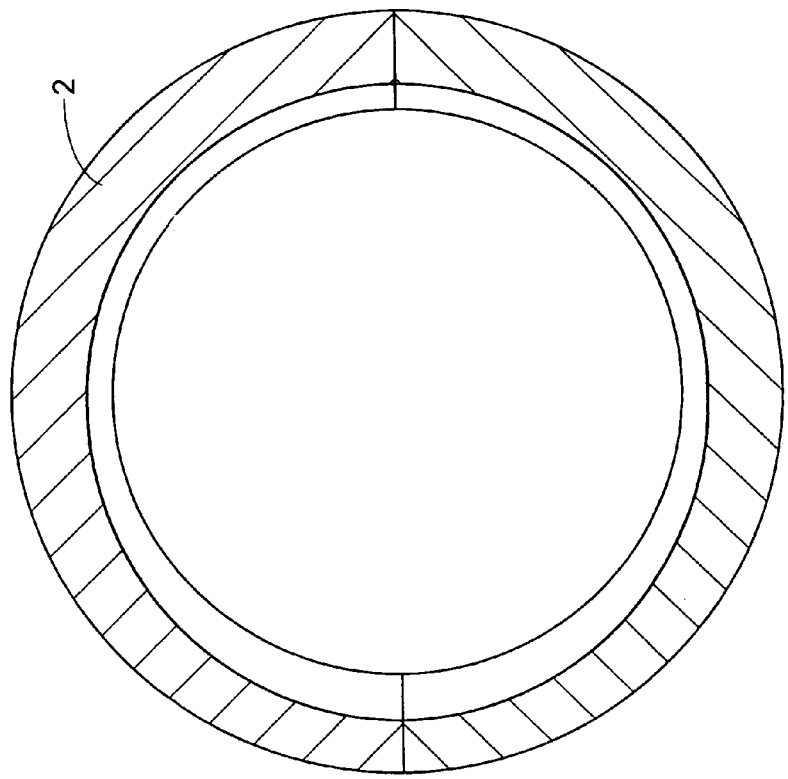
FIG. 2(b) is an end sectional view of FIG. 2(a) depicting the depth of ball path with respect to the nut.
Figure 2A:
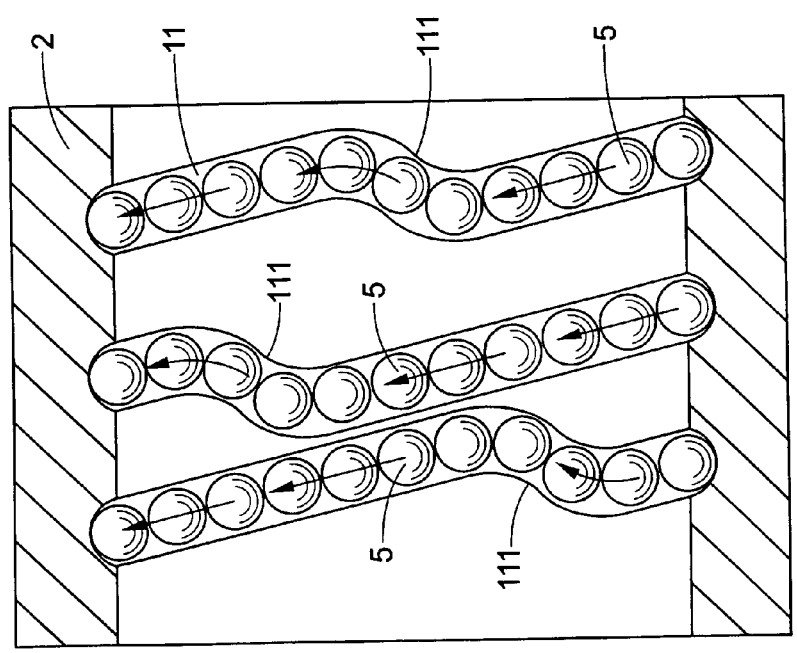
FIG. 2(a) is a side view diagram of a threaded ball nut made in accordance with the present invention.

FIG. 2(a) depicts the groove or path (11) on the interior surface of nut (2) along which balls (5) move. It should be noted that the depiction of FIG. 2(a) is merely a representation for use as an example, and is not meant to depict the exact configuration sizes or spacings of the grooves (11). What FIG. 2(a) is meant to make clear is that bearing balls (5) travel in a course or race defined by the grooves (11) in nut (2). The balls (5) are rolled along the mating helical path defined by the advancing grooves (11) in the nut (2) and the grooves (41) in the screw (4). The rotation of the screw and the nut with respect to each other is supported by the rolling action of the balls as they move forward along the helical path of complementary grooves (11) of the nut (2) and grooves (41) of screw (4).

The threads (42) of screw (4) define regular helical grooves (41) along which bearing balls (5) pass. For purposes of the present invention, screw (4) is of regular dimensions, and may be identical to conventional screws. It should also be understood that it is the loading of the screw (4) against the nut (2) through balls (5) that forces movement of the balls (5) through the advancing courses or paths (11). The return paths (111) are deep enough to provide clearance for the balls (5) as they pass over the screw lands (42). As a result, the balls are pushed through this area by balls still under load moving along path (11). The natural movement of the balls (5), as urged by the rotation of the nut (2) about the screw (4), provides the necessary translation of forces for this device and facilitates recirculation of the balls.

Figure 3B:
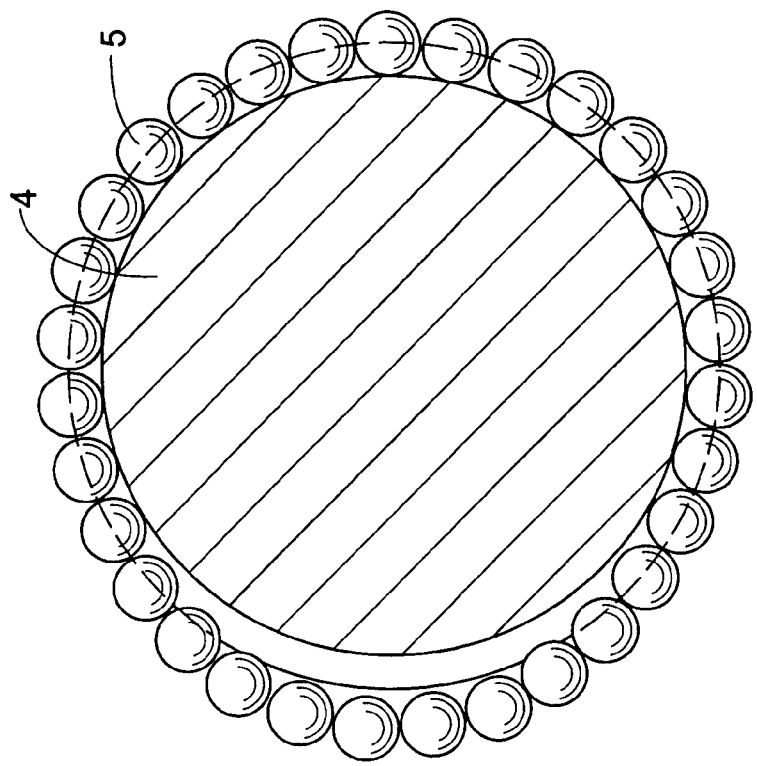
FIG. 3(b) is a side sectional view of FIG. 3(a), depicting the depth of the ball paths with respect to the screw.
Figure 3A:
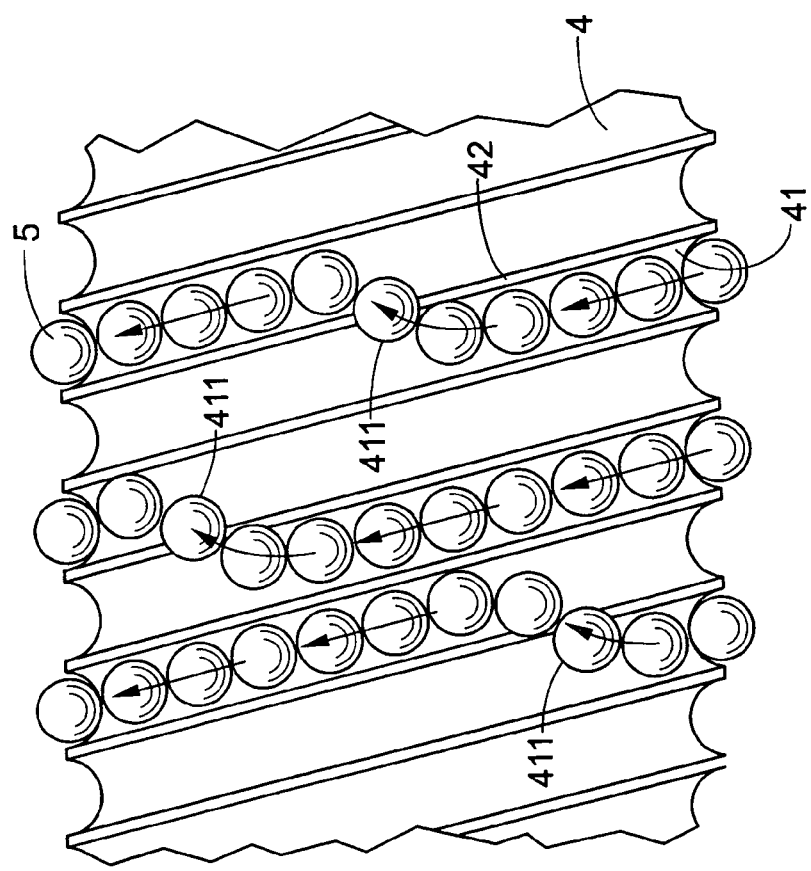
FIG. 3(a) is a side view diagram depicting ball paths with respect to a ball screw used with the present invention.

In this representative example, the present invention is effected by a combination of relationships between the lands (42) and grooves (41) of screw (4) and the grooves (11 and 111) of nut (2), thereby resulting in unrestricted recirculation of the bearing balls (5). The first relationship between the screw (4) and nut (2) is that the depths of the grooves of the screw are approximately one third the diameter of a bearing ball (5). This is depicted in FIG. 3(b), depicting the normal path of balls (5) in a selected groove (41).

Likewise, in FIG. 2(b) the bearing balls (5) are also arranged in groove (11), which is cut to a depth of approximately one-third the diameter of a ball. These two relative groove sizes define a relationship between the screw (4), the nut (2) and the bearing balls (5) for the normal rotation during which the balls advance in a forward direction along the helical thread with the turn of the screw. However, a special situation exists where the balls must be returned or flipped over to the previous (upstream) groove in order to effect recirculation of the bearing balls. This crucial recirculation takes place by means of return or crossback regions (111) on nut (2). Such recirculation is also illustrated at regions (411) on screw (4) in FIG. 3(a). For each portion of the circumference of nut (2) where return or crossback of bearing balls (5) takes place, the groove (11) in the nut (2) is cut to a depth of about two thirds of the ball diameter with adequate clearance for the ball to pass unimpeded over the land (42) between adjacent grooves (41) of the screw (4).

The groove is also arranged as indicated at crossback point (111) to direct the balls back to the previously traversed groove for that particular ball circuit. At a corresponding crossback point on the screw (4), the ball (5) is able to slide over the upper edge of land (42) that constitutes grooves (41) at crossback point (411). This is also depicted in the two end views FIGS. 2(b) and 3(b).

Figure 4:
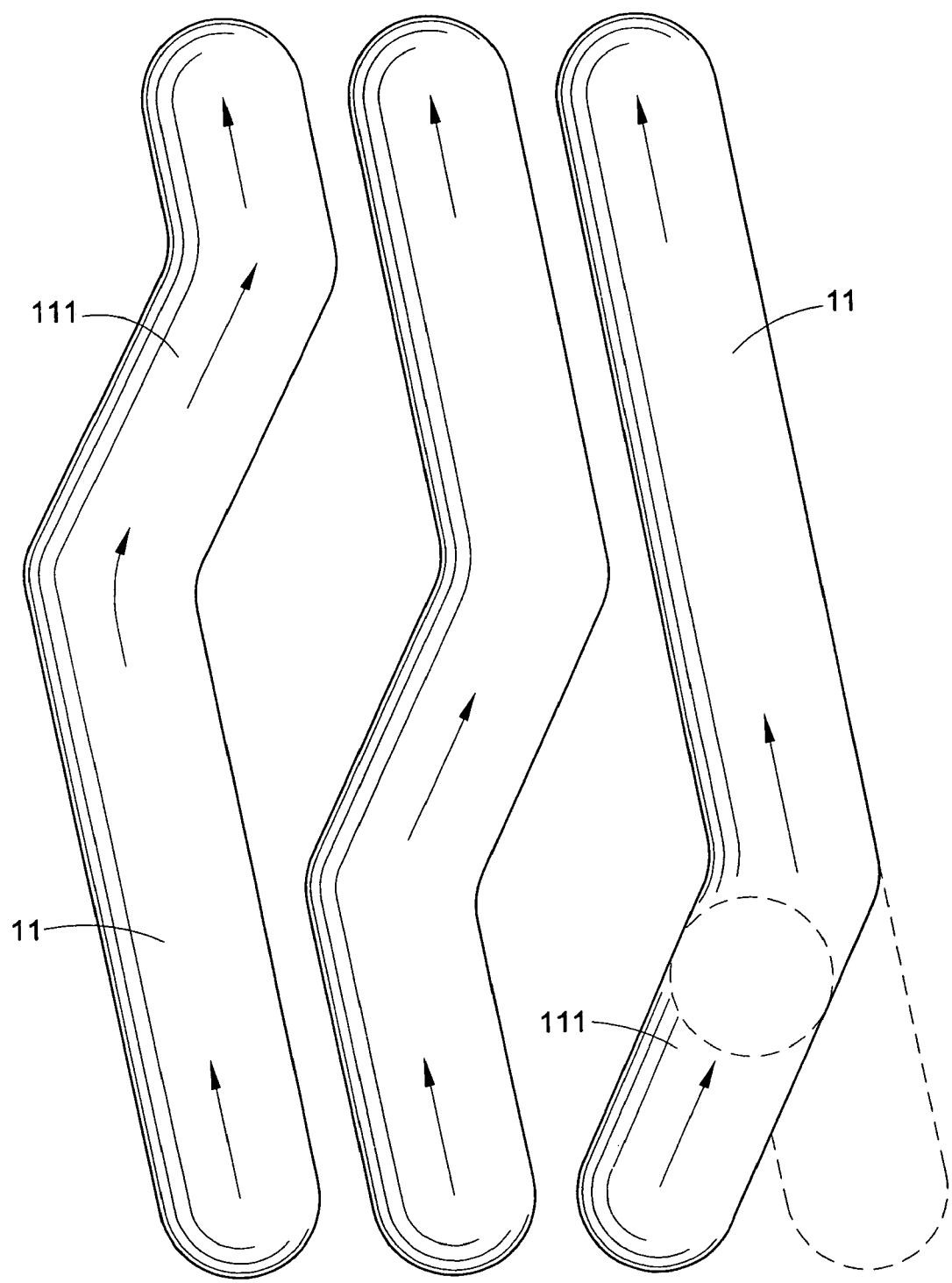
FIG. 4 is an expanded view of the inside surface of the ball nut depicting a number of ball paths.

An example of one configuration of grooves (11) from the interior diameter of nut (2) is found in FIG. 4, which depicts the grooves (11) as it would be for the cylinder of nut (2) to be opened and presented flat. Certain key relationships of this embodiment are used to facilitate the swift, unhindered passage of the balls (5) through the crossback areas (111). For example, approximately 120 degrees of a single 360 degree path on the interior circumference of the nut is dedicated to the crossback or return portion of the helical groove. By elongating the switchback to this degree, extremely sharp angles can be avoided without widening the grooves themselves.

In this representative example, the balls are approximately four millimeters in diameter and the pitch of the grooves in the nut (11) and the screw (41) are approximately five millimeters. The length of the return or crossback area (111) is approximately four diameters of a bearing ball (5). The lead of the screw (the amount that the screw advances laterally per revolution of the nut) is only slightly greater than the diameter of one of the ball bearings (5).

Figure 5:
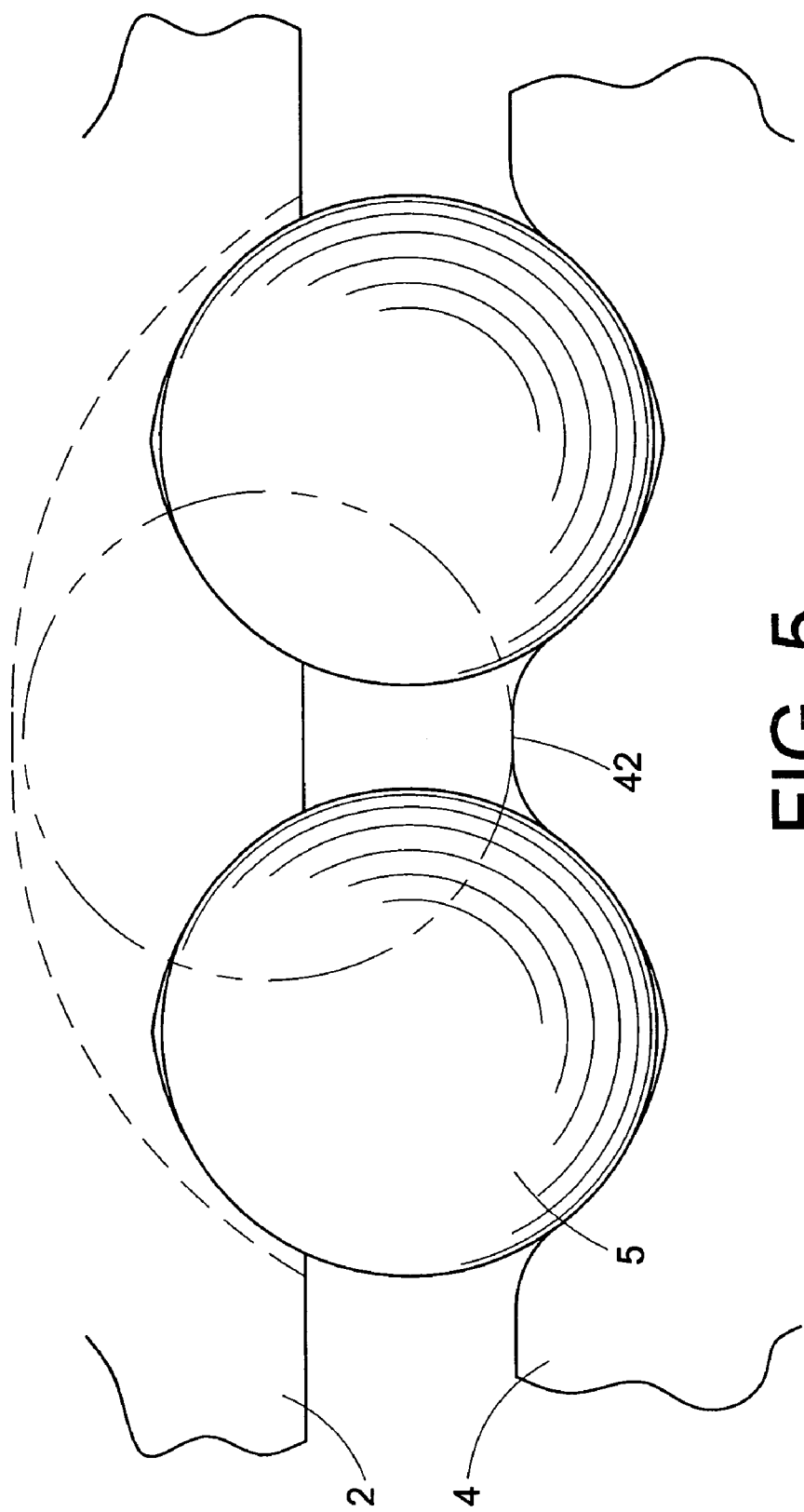
FIG. 5 is a side sectional view depicting an interface between the ball nut, the ball screw and the balls therebetween.

In the example depicted in the drawings, each 360 degree circuit on the inside radius of nut (2) contains both a forward advancing helical path and (11) and a return or crossback path (111). About two-thirds of the circuit is devoted to the advancing or forward path for the ball bearings, while the remainder of the circuit is devoted to a return or crossback path to return the balls to a position "upstream" of the forward path within the same 360-degree circuit. Within the crossback area (111), there is a change in depth. For the first portion of the crossback path, depth of the groove (41) increases from the normal depth for the advance forward path (approximately one-third the diameter of the ball (5)) to a greater depth, which allows clearance for the ball (5) to slip over the top of the screw land (42). The next portion of the return path is at the maximum depth of at least two-thirds the diameter of one of the balls. It is in this area that the balls are able to slide freely over the screw land (42) as depicted in FIG. 5. It should be noted that this section of return path (411) can be deeper than two-thirds the diameter of the bearing ball (5). Optionally, a rounded upper land (42) of screw (2) allows the ball (5) to rise easily over the land. The last portion of the return path is characterized by a gradually decreasing depth of groove (111) until the depth is equal to that of the normal advancing groove (11).

The result of this arrangement is a very smooth rotation of the nut on the screw, which in turn is caused by a very gradual, unhindered passage of the bearing balls (5) through the return or crossback areas (111) into the forward-advancing groove (11).

It should be noted that the arrangement of FIG. 4 is exemplary only and that modifications can be made maintaining the basic concept of the present invention. For example, the transition areas can be minimized to further shorten the path of the flipovers or crossbacks (111). The present example of the present invention returns the ball to an upstream position on the advance or forward part of the circuit (11). Within the concept of the present invention, recirculation of the balls can be effected within a single traverse of the nut grooves. Preferably, several such circuits would be cut or formed into the interior of the nut. It should be noted that when multiple such circuits are formed into the nut, the return or crossback sections are preferably not aligned with each other (unlike the slot design). Rather, they are staggered around the circumference of the nut. This is desirable to help maintain the wall strength of the nut and the support for the ball screw. It should also be noted that the use of multiple circuits within the structure of the nut is not absolutely necessary for the practice of the present invention. Rather, it has simply been found that multiple circuits with crossovers equally spaced around the nut work particularly well with the configuration of FIG. 4, providing equal radial support in all directions.

Cooperation between the structure of the nut (2) and screw (4) is absolutely essential for the operation of the present invention. In order for ball bearing (5) to follow the crossback or return route (111), it is necessary for the ball to ride up and slide over the upper portion of land (42), which is used to form grooves (41) in the screw (4). To facilitate this, land (42) may be rounded to allow ball (5) to slide effortlessly over the top at the same position where the corresponding groove (11) in nut (2) deepens to approximately two-thirds the diameter of the ball. While FIG. 5 depicts a 0.923-millimeter radius for a 4.672-millimeter diameter ball, these precise dimensions are not necessary for the operation of the present invention. All that matters is that the deepened groove (111) in the nut (2) be coordinated with the screw or land (42) to allow the ball to slip freely over the top in the switchback or flipover area (111) of the groove (11). Other dimensions can be used as long as the switchover area includes a deepening of the groove (111) to provide clearance for the ball to ride freely over the outer diameter of the screw.

Besides simplicity, there are other advantages to the present invention. By using the design of the present invention, the overall ball screw system is strengthened since there are no through holes drilled, and no insert slots are cut out of the interior of the nut. Further, there are reduced heat treatment problems because of improved symmetry of the nut and lack of mechanical features, which promote distortion. Consequently, it is much easier to apply uniform heat treatment to harden the nut or follower (2).

Because there are no caps or inserts, it is possible to make the walls of the nut or follower much thinner without compromising the overall strength of the nut. This is a crucial advantage in any number of different applications for ball screws. Further, a ball screw built in accordance of the present invention can use standard screw configurations to be mated with nuts of standard envelope dimensions that have internal construction in accordance with the present invention. This simplifies the process of acquiring the necessary parts for the ball screw. Further, because there are no through holes, there is no means by which the bearing balls can escape from the ball screw during operation. This novel safety feature prevents several modes of catastrophic failure, and recommends the ball screw of the present invention for use in crucial applications such as for steering systems for automobiles, and control surface manipulation in aircraft.

The aforementioned simplicity also leads to easier, less costly manufacturing of ball screw systems built and assembled in accordance with the present invention. Because the devices are drastically simplified, there are fewer manufacturing steps required to provide the recirculation features on the interior of the nut or follower. In particular, all internal features of the nut may be formed with as few as a single internal fabrication setup (with one or a plurality of cuts) in order to provide the required groove structure in the nut. No additional machining for tubes, inserts, or other devices are required. Further, the polishing or finish grinding necessary to achieve the modified screw thread configuration suggested in FIG. 5 is easily carried out, offering significant reduction in the manufacturing cost of the system.

Figure 1:
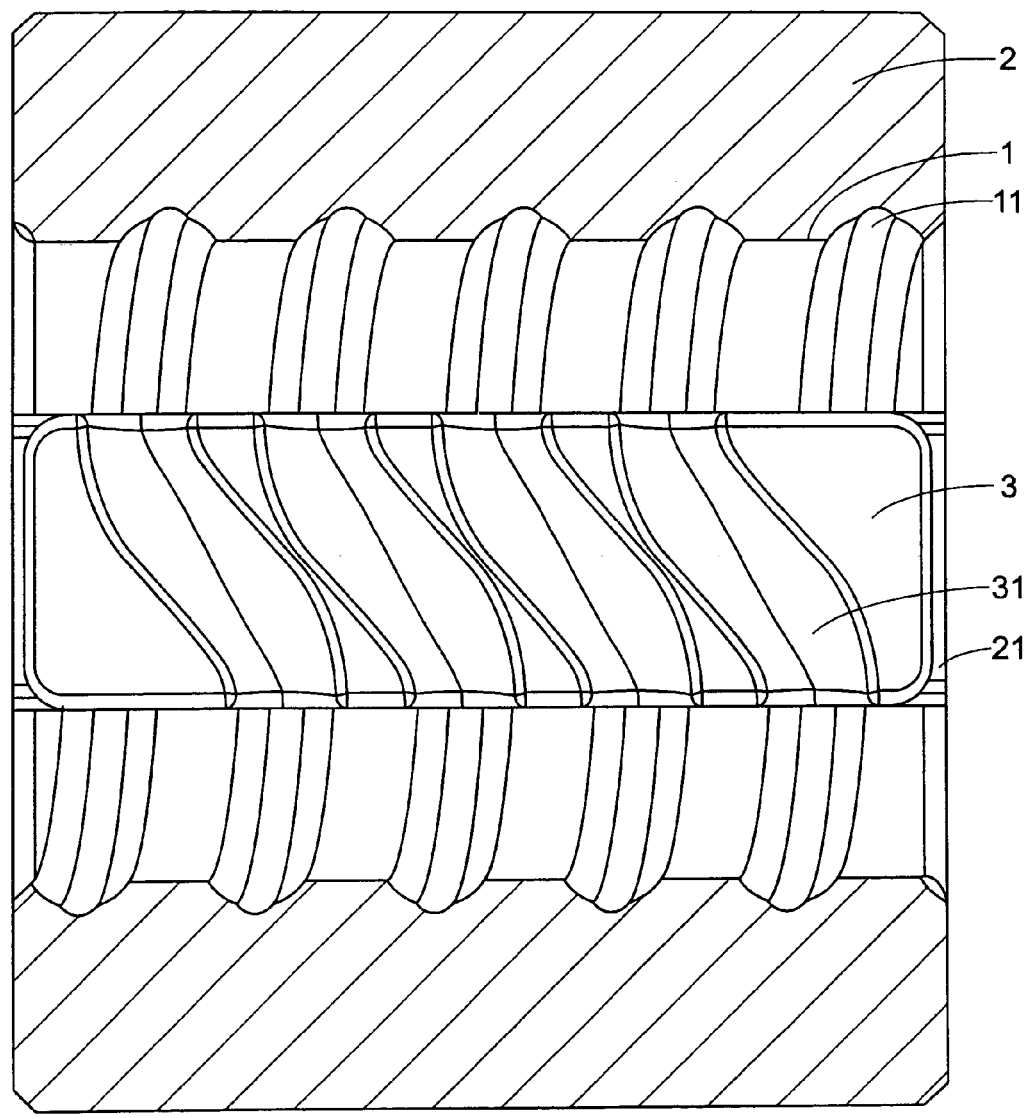
FIG. 1 is an interior view of a conventional ball nut structure having a notched insert.

In contrast, the conventional device depicted in FIG. 1 requires multiple manufacturing operations and numerous components, thereby rendering a device far more expensive to manufacture.

While a number of embodiments of the present invention have been illustrated by way of example, the present invention is not limited thereby. Rather, the present invention should be construed to include any and all variations, adaptations, permutations, derivations and embodiments that would occur to one skilled in this art once the present invention has been disclosed. Accordingly, the present invention should be interpreted as being limited only by the following claims.

I claim:

1. A ball screw and nut assembly including a screw having, on its exterior circumference, one or more continuous helical grooves and lands and a unitary nut having, in its interior circumference, at least one complementary, helical groove section, the nut being configured to rotate on said screw to achieve lateral movement along a major axis of said screw, said assembly comprising:
    (a) a plurality of bearing balls retained and under load between the grooves of said screw and said complementary grooves of the nut and forced to move in a forward direction along said major axis on a path formed by the grooves of the screw and nut to facilitate rotation of said nut about said screw; and,
    (b) internal recirculating means formed within a portion of each interior groove of the unitary nut having sufficient depth and structure different from the rest of that groove, said internal recirculating means allowing for movement of said bearing balls in a reverse direction along said major axis by sliding said bearing balls over at least one land between the adjacent grooves of said screw.

2. The ball screw assembly of claim 1, wherein said lands are rounded for easy traversal of said bearing balls.

3. The ball screw assembly of claim 1, wherein said internal recirculating means comprise at least one discrete circuit of said grooved nut, separate from any other internal paths formed in said nut.

4. The ball screw assembly of claim 3, wherein said internal recirculating means comprise means for guiding said bearing balls over at least one land of said threaded screw.

5. The ball screw assembly of claim 3, wherein said internal recirculating means comprise a plurality of said discrete circuits, each having means for guiding said bearing balls over said at least one land of said threaded screw.

6. The ball screw assembly of claim 5, wherein said several means for guiding are rotationally staggered around said internal circumference.

7. The ball screw assembly of claim 4, wherein said means for guiding said bearing balls comprise an area of maximum groove depth in said grooved nut.

8. The ball screw assembly of claim 7, wherein said portion of said internal re-circulating means comprise some fraction of the internal circumference of said grooved nut.

9. The ball screw assembly of claim 7, wherein said maximum groove depth is approximately two-thirds the diameter of one of said ball bearings.

10. The ball screw assembly of claim 1, wherein said grooves are formed by forming, casting, machining, or grinding.

11. The ball screw assembly of claim 1, wherein the internal recirculating means does not use any ancillary pieces.

12. A unitary grooved nut for a ball screw assembly, said nut having lands and helical grooves, said ball screw assembly including a complementary threaded screw having lands and helical grooves, said ball screw assembly comprising a plurality of bearing balls arranged on a race between said grooved nut and said threaded screw, said nut containing a continuous internal circuit constituting 360 degrees of an inner circumference of said nut, said circuit comprised of a helical path for advancing said bearing balls in a forward direction and a connected helical path for returning said bearing balls in a reverse direction.

13. The grooved nut of claim 12, wherein at least a portion of said return path is cut more deeply than said forward path.

14. The grooved nut of claim 12, wherein said nut comprises a single or plurality of said continuous circuits, each said circuit being separated from the others.

15. The nut of claim 12, wherein said forward path is approximately two-thirds of said circuit of said internal circumference of said nut.

16. A ball screw and nut assembly including a screw having lands and helical grooves therebetween, a plurality of bearing balls, and a unitary nut having complementary helical grooves which, in combination with said grooves of the screw, form a passageway for the travel of the bearing balls, wherein at least one of the grooves in the unitary nut including a recessed portion to provide unloading and return of the bearing balls over at least one land of said screw by having a depth and pitch different from the remainder of said grooves.

17. A ball screw and nut assembly consisting of:
    (a) a screw having, on its exterior circumference, one or more continuous helical grooves and lands;
    (b) a unitary nut having, in its interior circumference, at least one complementary, helical groove section, the nut being configured to rotate on said screw to achieve lateral movement along a major axis of said screw;

(c) a plurality of bearing balls retained and under load between the grooves of said screw and said complementary grooves of the nut and forced to move in a forward direction along said major axis on a path formed by the grooves of the screw and nut to facilitate rotation of said nut about said screw; and (d) internal recirculating means formed within a portion of each interior groove of the unitary nut having sufficient depth and structure different from the rest of that groove, said internal recirculating means allowing for movement of said bearing balls in a reverse direction along said major axis by sliding said bearing balls over at least one land between the adjacent grooves of said screw.

* * * * *